United States Patent [19]

Frye et al.

[11] 4,065,647

[45] Dec. 27, 1977

[54] AUTOMATIC ACOUSTICAL TESTING SYSTEM

[76] Inventors: George Joseph Frye, 12175 SW. Douglas, Portland, Oreg. 97225; Leonardus Johannes Geerling, Rte. 2, Box 124D, Hillsboro, Oreg. 97123

[21] Appl. No.: 706,640

[22] Filed: July 19, 1976

Related U.S. Application Data

[63] Continuation-in-part of Ser. No. 608,871, Aug. 29, 1975.

[51] Int. Cl.$^2$ ............................................ H04R 29/00
[52] U.S. Cl. ........................... 179/175.1 A; 179/107 R
[58] Field of Search ......... 179/175.1 A, 175, 175.2 R, 179/175.2 C, 107; 444/1

[56] References Cited

U.S. PATENT DOCUMENTS

| | | | |
|---|---|---|---|
| 3,634,633 | 1/1972 | Driscoll | 179/175.2 R |
| 3,692,959 | 9/1972 | Lamp | 179/175.1 A |
| 3,692,961 | 9/1972 | Le Strat et al. | 179/175.2 R |
| 3,842,218 | 10/1974 | De Luca et al. | 179/2 A |
| 3,922,506 | 11/1975 | Frye | 179/175.1 A |

*Primary Examiner*—Douglas W. Olms
*Attorney, Agent, or Firm*—Adrian J. LaRue

[57] ABSTRACT

An automatic acoustical testing system is described wherein a digital computer controller utilizing hard-wired program memory is used to control testing of acoustical devices, such tests being carried out by driving a device to be tested with audio sound generator means and processing the output of the device by circuit means that are under the control of the computer resulting in digital readouts of the device's output amplitude and purity as well as providing graphical representations thereof.

8 Claims, 6 Drawing Figures

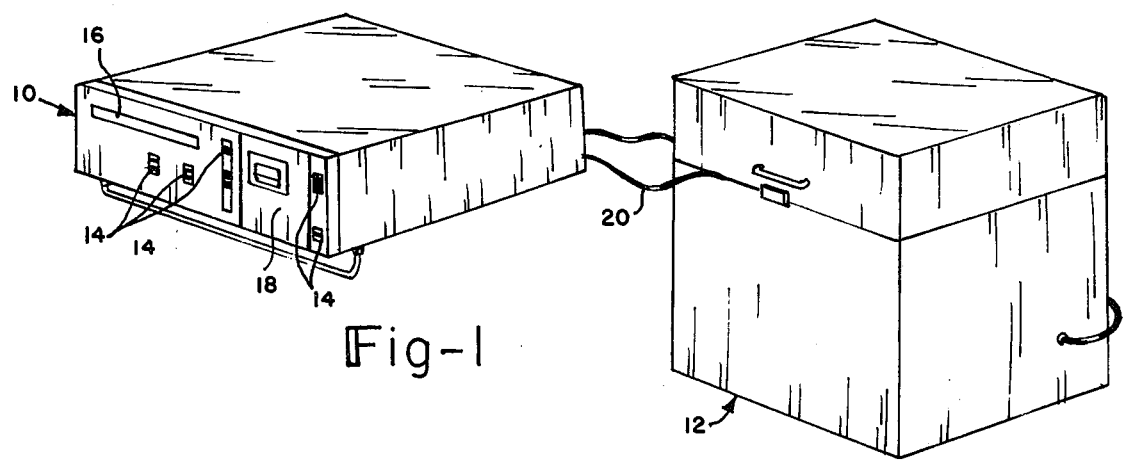
Fig-1
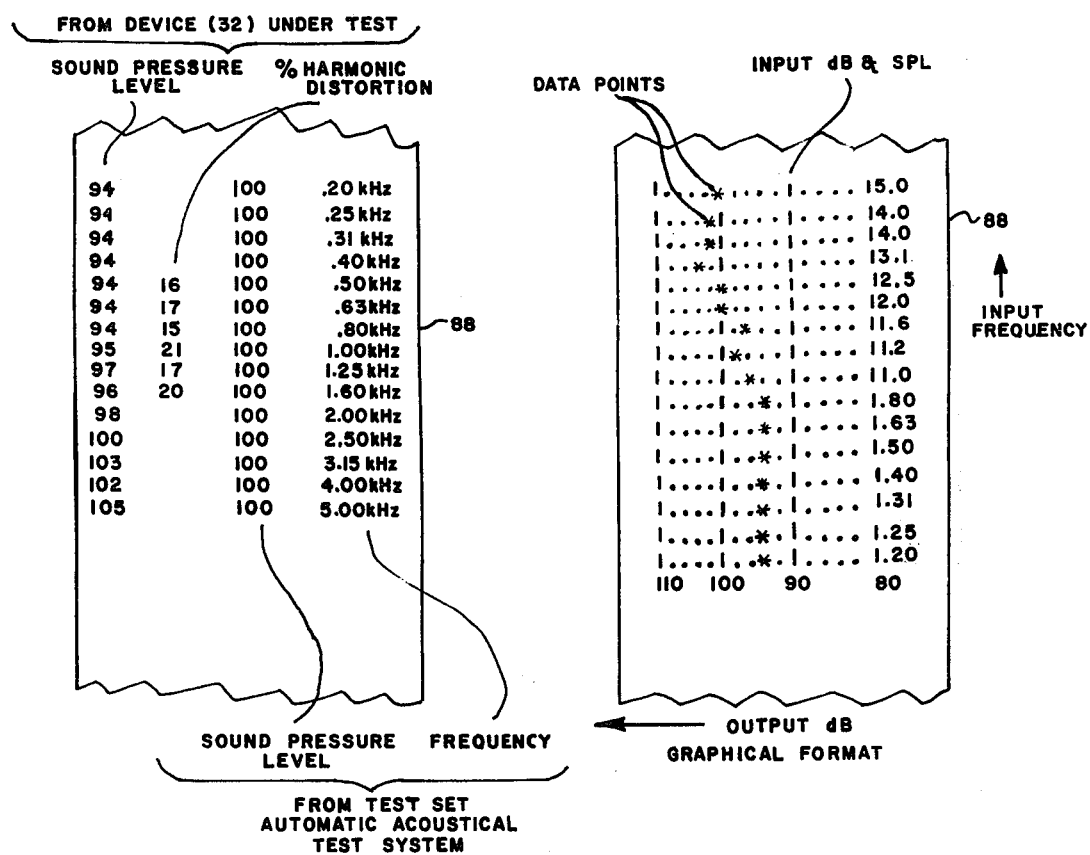
Fig-5
Fig-6

AUTOMATIC ACOUSTICAL TESTING SYSTEM

CROSS REFERENCE TO RELATED APPLICATION

This application is a continuation-in-part application of U.S. patent application Ser. No. 608,871, filed Aug. 29, 1975.

BACKGROUND OF THE INVENTION

Acoustical testing systems are known which provide calibrated sound pressure levels and frequencies. These are preferably designed to drive the device under test in an anechoic environment, i.e. free of sound reflections. Typically, this type of environment is impractical for small testing systems, especially at the low audio frequencies. The output of the device under test is then passed through a measuring system which is capable of providing readings of sound pressure level and/or harmonic distortion components. A significant drawback of these existing acoustical testing systems is that a highly-skilled operator is required for their proper operation due to their requirement for complicated interconnection of parts of the system combined with easily misinterpreted readout means. They generally use thermionic components with their attendant problems regarding long term stability, power comsumption and size.

An improvement over the above older systems was disclosed in U.S. Pat. No. 3,922,506 which disclosed a digital acoustical testing system that minimized operator error by providing automatic digital methods of presentation of data.

The present invention further minimized possibilities of operator error by providing computer control over the entire testing procedure rather than restricting the automatic processing to the measurement of the output of the device under test. The computer, operating under control of a hard-wired program, automatically steps the frequency of the acoustical drive signal, maintains its amplitude at a desired level, and, at the same time, monitors and digitizes the signal from the device under test, whereafter such digitized signals are digitally displayed and a hard copy made thereof in a digital or graphical format.

An object of the present invention is to provide an automatic acoustical testing system to minimize operator error and fatigue.

Another object of the present invention is the provision of an automatic acoustical testing system utilizing computer control for maximum flexibility of test procedures.

A further object of the present invention is to provide an automatic acoustical testing system having automatically adjusted and scaled circuit means which provides positive information to be processed thereby.

An additional object of the present invention is the provision of an automatic acoustical testing system that includes a digitally-controlled constant amplitude amplifier that makes use of digitized levels of an analog signal to provide a signal of substantially constant amplitude.

A still further object of the present invention is to provide a computer-controlled printer means for providing hard copy of electronically-processed information in a digital data format or graphical representation thereof.

These and other objects and advantages of the present invention will become apparent from the following description when taken in conjunction with the accompanying drawings. It is to be understood that variations of the present invention can be made without departing from the scope of the invention as defined herein.

BRIEF DESCRIPTION OF THE DRAWINGS

FIG. 1 is a frontal perspective view showing the overall outward appearance of the automatic acoustical testing system;

FIG. 5 shows hard copy output from the automatic acoustical test system representing digital data format; and FIG. 6 shows hard copy output similar to FIG. 5 representing graphical format.

DETAILED DESCRIPTION OF THE INVENTION

Figure 2:
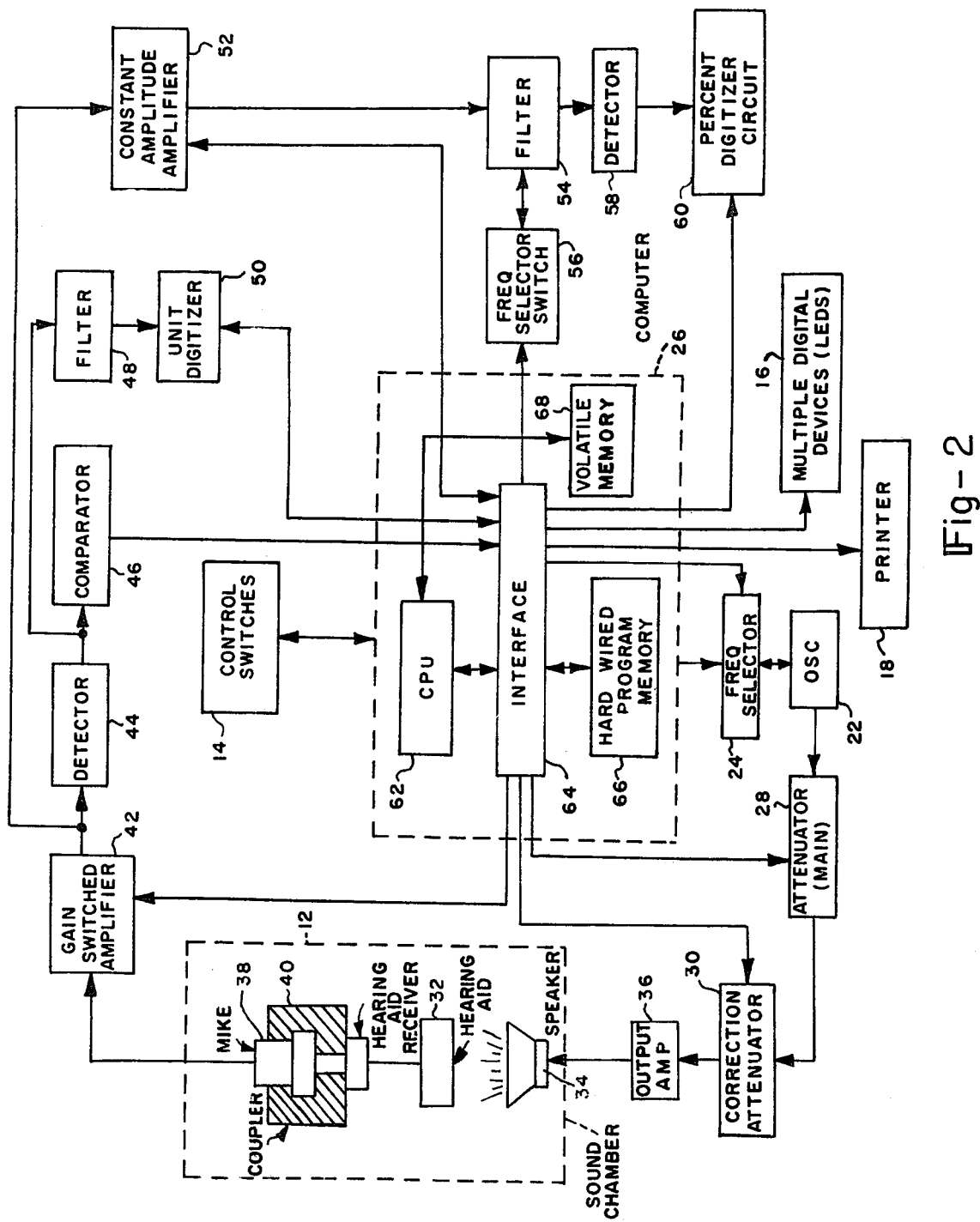
FIG. 2 is a block diagram of the automatic acoustical testing system.

Turning now to FIG. 1, there is shown an electronics module 10 which houses the electronic circuitry of the automatic acoustical testing system and a sound pressure chamber 12 in which the device to be tested is located. Electronics module 10 has control push buttons 14 for operator control over the measurement and hard copy display. Visual indication of the acoustical drive and measurement processes is provided by multiple digital devices 16. Hard copy printer 18 is also housed in the electronics module and is controlled by the operator via one of push buttons 14 under the control of the computer.

Sound pressure chamber 12 has a construction as disclosed in U.S. Pat. No. 3,923,119 and is connected to electronics module by electrical cable means 20.

FIG. 2 shows an oscillator 22 of conventional construction and utilized in U.S. Pat. No. 3,922,506 whose frequency is determined by frequency selector switch 24 which is under the control of the computer 26 to be discussed in greater detail hereinafter. Frequency selector switch 24 can be constructed utilizing conventional reed switches, relays, FET's, bipolar transistors or C-MOS devices.

The signal from oscillator 22 has a constant amplitude and is attenuated by attenuator switch 28 which may have similar construction as that of frequency selector switch 24 and is also under control of computer 26. The attenuated signal from attenuator switch 28 is then further attenuated as needed by correction attenuator 30 which may be constructed in the same manner as frequency selector switch 24. Correction attenuator 30 is also under the control of computer 26.

Attenuator switch 28 and correction attenuator 30 in combination provide the necessary signal level conditioning such that the desired sound pressure levels are presented to a device 32 under test which has been positioned in sound pressure chamber 12 which has its speaker 34 driven by output amplifier 36 of conventional construction.

Device 32 under test, which is typically a hearing aid, is coupled to microphone 38 via coupler 40 which may be in the form of the coupler disclosed in U.S. Pat.

Application Ser. No. 550,196, now Pat. No. 3979567 Feb. 18, 1975.

The output from microphone 38 is connected into gain-switched amplifier 42 which is under control of computer 26 and is of conventional construction wherein it is formed of three cascaded amplifiers, each of which has a gain of 0 or 40, 0 or 20, and 0 or 10 dB, respectively as a binary sequence. Switches controlling the gains of the cascaded amplifiers may be of the same general construction as those employed in frequency selector switch 24 and such switches are controlled via computer 26.

The signal from gain-switched amplifier 42 is sent to detector 44 of conventional form and which provides a DC voltage level that is compared against voltage references contained within comparator circuit 46, also of conventional design. The action of the DC voltage level from detector 44 and the comparator 46 provides information to the computer 26 which makes possible the correct gain setting of the gain-switched amplifier 42. The binary form of the gain-controlling signal provides needed information for the digitizing process (MSD-most significant digit).

The DC voltage signal from detector 44 is smoothed out in filter 48 of conventional form and is then passed to unit digitizer 50 which is under the control of computer 26. The action of the unit digitizer 50 and other elements in amplitude digitizer circuitry which includes gain-switched amplifier 42, detector 44, comparator 46 and filter 48 are similar to the system as disclosed in U.S. Pat. 3,922,506 and operates in similar manner with improvements being provided by digital computer 26. Such improvements are: a greater degree of resolution in the digitizing process, more flexibility in the use of the digital information derived from the digitising process and greater speed of operation is realized.

The signal from gain-switched amplifier 42 is of a level that is held within selected limits spaning a 10-1 voltage range (20 dB). This signal is of the same form as that received from the device 32 under test; it is now sent to constant amplitude amplifier 52 which is under control of computer 26 and will be described in greater detail hereinafter. The signal emerging from constant amplitude amplifier 52 is of constant amplitude is filtered by filter 54 of conventional design. Filter 54 is controlled by frequency selector switch 56 under the control of computer 26 and has a construction similar to frequency selector switch 24.

The signal emerging from filter 54 is detected in detector 58 of conventional construction and the resultant DC voltage level is transmitted to percent digitizer circuit 60 which has a similar construction as unit digitizer 50 and is under control of computer 26. Constant amplitude amplifier 52, filter 54, frequency selector switch 56, detector 58 and percent digitizer circuit 60 in combination with computer 26 form a distortion analyzer circuit.

Computer 26 is basically comprised of a central processing unit (CPU) 62, an interface circuit 64, a hardwired program memory 66 and a volatile memory 68. CPU 62 is the main control element of computer 26 and is of conventional design. It receives its instructions via interface circuit 64 of conventional design and the hardwired program memory 66 which is typically composed of read only memories (ROM's). CPU 62 is also connected to volatile memory 68 which is typically composed of random access memories (RAM's). Computer 26 receives its control signals via control switches 14 on the front panel of electronics module 10 of FIG. 1.

The digital information used in the control and measurement of the device 32 under test is stored in volatile memory 68. This information is used to provide the basis for the digital readout of information by the multiple digital devices 16 comprising LED's, and the hard copy printer 18 which is to be described in greater detail hereinbelow.

Figure 3:
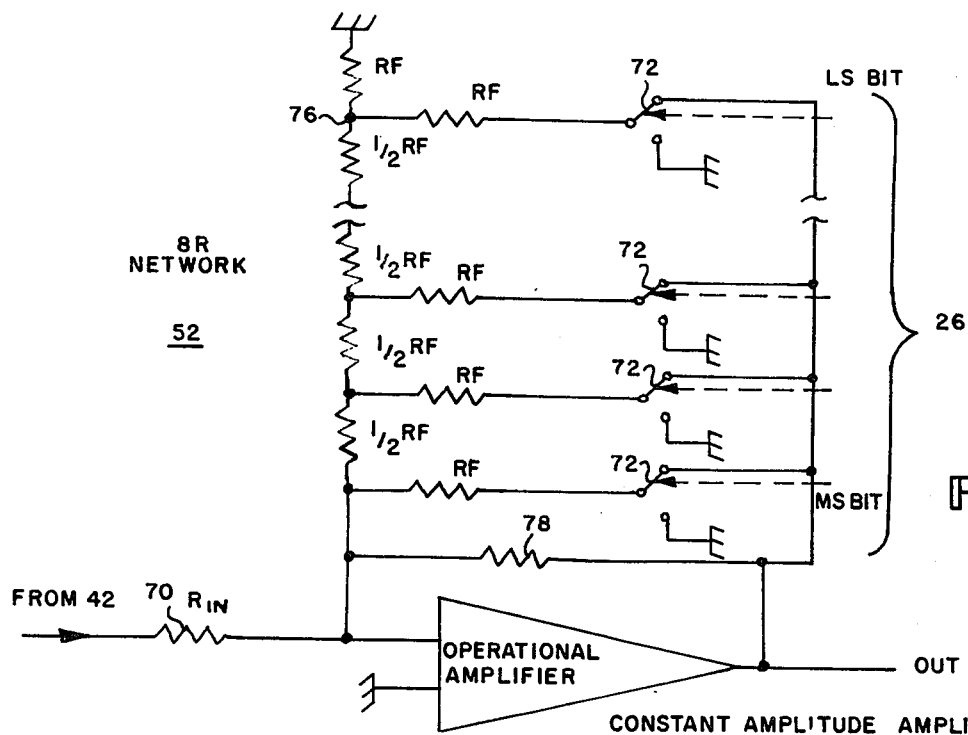
FIG. 3 is a schematic diagram of the digitally-controlled constant amplitude amplifier.

FIG. 3 shows in greater detail constant amplitude amplifier 52 wherein the signal from gain-switched amplifier 42 is brought into the amplifier through resistor 70. This signal, as previously mentioned, is of the same configuration as that of the device 32 under test and further varies in amplitude over a restricted range of 10-1. The lowest level of the signal represents a digitized number of 0 or in binary form —00000000—. When a signal of this level is presented to the constant amplitude amplifier circuit, it simultaneously measured by means of unit digitizer 50 and found to have this 0 level. Computer 26 is now made to drive switches 72 and causes them to be connected either to the output of operational amplifier 74 or to ground depending upon the binary member representing the unit digitized level of the signal voltage and providing a feedback. Alternatively, an automatic digitizer circuit similar to that described in U.S. Pat. No. 3,922,506 can be used to operate switches 72, if desired. If the most significant bit (MSB) is a binary 1, the switch 72 closest to operational amplifier 74 will be connected to the output thereof. Switches 72 can be electronic switches similar to those used in frequency selector switch 24 and operational amplifier 74 is of conventional design. The resistor network 76 is composed of a conventional binary ladder.

It is readily discerned that the smallest signal of a zero binary value is one-tenth the maximum amplitude of the signal from gain-switched amplifier 42. When a signal of this amplitude is present, all of switches 72 are connected to ground, and operational aplifier 74 gain is set by the resistor ratio of resistor 78 divided by resistor 70. In this configuration, the constant amplitude aplifier 52 has its maximum gain. The maximum signal from gain-switched amplifier 42 is labelled with a binary number —11111111— which causes all of switches 72 to be connected to the operational amplifier 74 output. Under this condition, constant amplitude amplifier 52 has minimum gain. The signal emerging from constant amplitude amplifier 52 will be maintained at constant amplitude by action of switches 72 set with previous signal information derived from unit digitizer 50.

Figure 4:
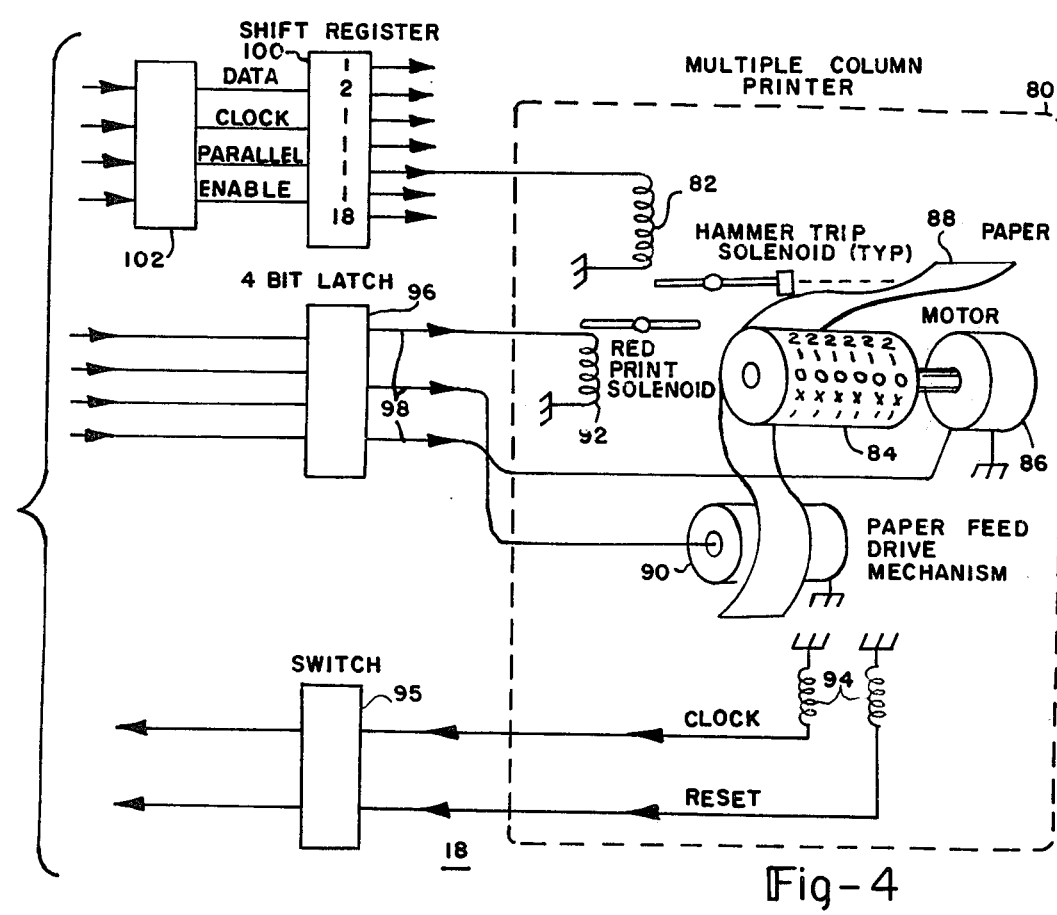
FIG. 4 is a block diagram of a computer-controlled printer.

FIG. 4 shows in greater detail printer 18 wherein multiple column printer 80 (typically 18 columns) of commercial design includes multiple hammer trip solenoids 82 used to imprint indicia located on printing drum 84 continuously driven by motor 86 onto paper 88 that passes in engagement therewith under control of paper feed drive mechanism 90. Black indicia is normally printed onto paper 88, however red indicia can be imprinted onto paper 88 via red print solenoid 92.

Computer 26 is informed of the indicia available for printing at any one moment by signals received from clock and reset pickup coils 94 through conventional electronic switch 95. Computer 26 has control over the paper feed drive mechanism 90, the motor 86, and red print solenoid 92 through 4 bit latch 96 and interface amplifiers 98 all being of conventional design.

Hammer trip solenoid signals are serially loaded into a conventional shift register 100 by means of 4 bit latch 102 of similar configuration as that of 4 bit latch 96 under the control of computer 26. The shift register 100 can be made to drive in parallel all desired hammer trip solenoids 82 by means of the parallel enable pulse at the desired moment causing the selected indicia to be imprinted on paper 88.

FIG. 5 illustrates a printed copy of paper 88 imprinted with digital data format information. As can be discerned, the information presented provides a permanent record of the frequency and amplitude of the test signal and sound pressure level and percent of harmonic distortion of the signal from device 32 under test.

FIG. 6 illustrates a printed copy of paper 88 imprinted with information of graphical format, presenting an easily interpreted representation of the frequency response of the device 32 under test.

Although the invention has been described hereinbefore with respect to the several embodiments, it will be appreciated that various changes and modifications may be made therein without departing from the scope of the invention as claimed in the accompanying claims.

The invention is claimed in accordance with the following:

1. An automatic acoustical testing system, comprising in combination:
    oscillator means for generating a selected signal frequency;
    amplifier means for receiving said selected signal frequency and amplifying same to provide an amplified driving signal;
    means coupling said driving signal to an acoustical device to be tested;
    means receiving an output from the device to be tested and digitially processing said output;
    distortion analyzer circuit means receiving an output signal from said receiving and digitally processing means and further processing said output signal;
    digital computer processor means interfacially connected to said oscillator means, amplifier means, receiving and digitally processing means and distortion analyzer circuit means for controlling and processing analog and digital signals provided to and derived from said oscillator means, amplifier means, receiving and digitally processing means and distortion analyzer circuit means; and
    readout means interfacially connected to said digital computer processor means for providing readout of said analog and digital signals.

2. An automatic acoustical testing system according to claim 1 wherein said oscillator means and said amplifier means are connected by switched attenuator means interfacially controlled by said digital computer processor means.

3. An automatic acoustical testing system according to claim 1 wherein said receiving and digitally processing means comprise gain-switched amplifier means, detector means, comparator means, filter means and unit digitizer means.

4. An automatic acoustical testing system according to claim 1 wherein said distortion analyzer circuit means comprises constant amplitude amplifier means, filter means, frequency selector switch means, detector means and percent digitizer circuit means.

5. An automatic acoustical testing system according to claim 1 wherein said digital computer processor means comprises central processing unit means, interface circuit means, hard-wired program memory means and volatile memory means.

6. An automatic acoustical testing system according to claim 1 wherein said readout means comprises means for providing visual digital representations.

7. An automatic acoustical testing system according to claim 1 wherein said readout means comprises means for providing hard copy of acoustic response of said acoustical device to be tested in digital data format.

8. An automatic acoustical testing system according to claim 1 wherein said readout means comprises means for providing hard copy of acoustic response of said acoustical device to be tested in graphical format.

* * * * *